United States Patent
Dodson, III

(10) Patent No.: US 6,703,889 B2
(45) Date of Patent: Mar. 9, 2004

(54) IN-RUSH CURRENT PROTECTION

(75) Inventor: George Bertran Dodson, III, Glendale, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

(21) Appl. No.: 10/076,470

(22) Filed: Feb. 14, 2002

(65) Prior Publication Data

US 2003/0151445 A1 Aug. 14, 2003

(51) Int. Cl.[7] .................................................. H03K 17/687
(52) U.S. Cl. .......................... 327/434; 327/328; 327/427
(58) Field of Search ............................... 327/309, 310, 327/311, 312, 313, 327, 328, 379, 384, 427, 434; 307/126, 130

(56) References Cited

U.S. PATENT DOCUMENTS

| | | | |
|---|---|---|---|
| 3,935,527 A | 1/1976 | Michelet et al. | |
| 3,968,421 A | 7/1976 | Marcade | |
| 3,993,935 A | 11/1976 | Phillips et al. | |
| 4,079,440 A | 3/1978 | Ohnuma et al. | |
| 4,245,270 A | 1/1981 | Busby | |
| 4,647,848 A * | 3/1987 | Barrett | 324/95 |
| 4,656,320 A | 4/1987 | Maddock | |
| 4,658,320 A * | 4/1987 | Hongel | 361/13 |
| 4,678,984 A | 7/1987 | Henze | |
| 4,814,687 A | 3/1989 | Walker | |
| 4,891,728 A | 1/1990 | Preis et al. | |
| 4,908,489 A | 3/1990 | Panecki et al. | |
| 5,010,293 A | 4/1991 | Ellersick | |
| 5,077,675 A | 12/1991 | Tam | |
| 5,079,455 A | 1/1992 | McCafferty et al. | |
| 5,122,724 A | 6/1992 | Criss | |
| 5,155,648 A | 10/1992 | Gauthier | |
| 5,187,653 A | 2/1993 | Lorenz | |
| 5,283,707 A | 2/1994 | Conners et al. | |
| 5,374,887 A * | 12/1994 | Drobnik | 323/299 |
| 5,519,264 A | 5/1996 | Heyden et al. | |
| 5,559,660 A | 9/1996 | Watson et al. | |
| 5,563,545 A * | 10/1996 | Scheinberg | 327/389 |
| 5,587,685 A | 12/1996 | Johansson | |
| 5,619,127 A | 4/1997 | Warizaya | |
| 5,714,809 A | 2/1998 | Clemo | |
| 5,737,165 A | 4/1998 | Becker | |
| 5,774,315 A | 6/1998 | Mussenden | |
| 5,784,244 A | 7/1998 | Moran et al. | |
| 5,834,924 A | 11/1998 | Konopka et al. | |
| 5,898,844 A | 4/1999 | Thompson | |
| 5,903,182 A * | 5/1999 | Jordan | 327/540 |
| 5,932,943 A | 8/1999 | Werner et al. | |
| 5,951,660 A | 9/1999 | Van Wonterghem | |
| 5,990,723 A | 11/1999 | Tanase | |
| 6,028,755 A | 2/2000 | Saeki et al. | |
| 6,046,896 A | 4/2000 | Saeki et al. | |
| 6,054,899 A * | 4/2000 | Ke | 330/278 |
| 6,105,091 A | 8/2000 | Long | |
| 6,188,305 B1 | 2/2001 | Chang et al. | |
| 6,204,648 B1 | 3/2001 | Saeki et al. | |
| 6,225,797 B1 | 5/2001 | Willis et al. | |
| 6,308,233 B1 | 10/2001 | Park | |
| 6,335,654 B1 * | 1/2002 | Cole | 327/546 |

* cited by examiner

*Primary Examiner*—Terry D. Cunningham
(74) *Attorney, Agent, or Firm*—Fogg and Associates, LLC; David N. Fogg

(57) ABSTRACT

A circuit for controlling inrush current to a load is provided. The circuit includes a variable impedance device having a control input. The variable impedance device is coupled between a power supply interface and a load interface. The circuit also includes a control circuit coupled to the control input of the variable impedance device and also coupled to the load interface. The control circuit is adapted to provide a signal at the control input of the variable impedance device which results in a linear increase in applied voltage to the load when the circuit is coupled to an input power source. A resistor is coupled between the first and second terminals of the power supply interface to provide a current discharge path for the control circuit when the circuit is disconnected from the power supply.

34 Claims, 3 Drawing Sheets

IN-RUSH CURRENT PROTECTION

TECHNICAL FIELD

The present invention relates generally to the field of electronic circuits and, in particular, to in-rush current protection.

BACKGROUND

In the field of telecommunications, it is customary to service equipment while operational to minimize the impact on service to customers. Therefore, it has become an industry standard that circuit boards or electronic modules should be both removeable and insertable under system power without damaging the sensitive electronic circuits on the circuit boards or electronic modules. Inserting and removing circuit boards in a live system, e.g., a powered system, is conventionally referred to as "hot swapping" or "hot plugging" of circuit boards.

Unless precautions are taken, destructive inrush currents could damage the electronic circuits during hot swapping operations in a live system. These inrush currents flow in connector contacts and electrical components when a circuit card is plugged into a system under power. If inrush current is not limited in some way, peak current levels can exceed electrical component ratings, thereby destroying functional circuits on the card.

For example, when currents are not intentionally limited, common solid state digital circuits and switching power converters could be damaged by inrush currents. It is the nature of common solid state digital circuits and switching power converters to incorporate substantial amounts of capacitance across the input power terminals to improve power regulation, reduce electrical noise and prevent electromagnetic radiation. When these uncharged capacitors are suddenly connected to a power source with low impedance, currents flow so as to charge the capacitors up to the power source voltage potential. These inrush currents are limited only by circuit resistances, which are intentionally designed to be very low so as to provide low system loss and good voltage regulation. Because of this, inrush currents can easily exceed destructive levels of both connector materials and electrical components. Adding resistance is of course undesirable as it will result in power loss and degrade voltage regulation, both which affect system performance.

Although current limiting circuitry is both fairly simple and inexpensive, a large number of solutions already exist. There are drawbacks to many conventional approaches to inrush current limiting. One approach to current inrush limiting is described in U.S. Pat. No. 5,079,455 (The '455 Patent). The circuit shown in the '455 Patent has at least two drawbacks.

The first drawback with the circuit shown in the '455 Patent relates to the manner in which the load is discharged upon disconnection from the power supply. In a common application of the current limiting circuit, the load includes a switching power supply which does not exhibit linear resistive characteristics. In fact, the switching power supply is highly nonlinear and frequently stops drawing current completely below a particular input threshold voltage level. As the transistor 14 has an intrinsic diode from source to drain, this effect of incompletely discharging the load capacitance can result in capacitors 20 and 22 remaining in a charged state when reinserted. The current limiting function of the circuit shown in the '455 Patent can be severly compromised or negated entirely in this arrangement.

The second drawback relates to regulation of the voltage at the gate of transistor 14 in the '455 Patent. Specifically, in a typical telecommunications application, a voltage of 48 volts is typically applied across the input terminals. During the time interval between application of input power and turn on of transistor 14, capacitor 22 is charged exponentially toward 48 volts with a time constant determined by resistors 16 and 18 and capacitor 22. Due to the high voltage applied to the RC circuit, relatively high time constants (high component values) are required to achieve acceptable operation. Further, diode 24 exhibits imprecise voltage limiting characteristics at low current levels in conjunction with substantial leakage currents at voltages below the normal turn on point necessitating lower resistance values in the configuraion shown in the '455 Patent.

For the reasons stated above, and for other reasons stated below which will become apparent to those skilled in the art upon reading and understanding the present specification, there is a need in the art for a technique for limiting currents below destructive values during "hot plugging" while offering low loss under normal operating conditions.

SUMMARY

The above-mentioned problems with in-rush current protection and other problems are addressed by embodiments of the present invention and will be understood by reading and studying the following specification. Specifically, embodiments of the present invention provide for limiting in-rush current when hot plugging an electronic module by controllably turning on a transistor to provide a substantially linear voltage ramp to a functional circuit.

In one embodiment, a circuit for controlling inrush current to a load is provided. The circuit includes a variable impedance device having a control input. The variable impedance device is coupled between a power supply interface and a load interface. The circuit also includes a control circuit coupled to the control input of the variable impedance device and also coupled to the load interface. The control circuit is adapted to provide a signal at the control input of the variable impedance device which results in a linear increase in applied voltage to the load when the circuit is coupled to an input power source. A resistor is coupled between the first and second terminals of the power supply interface to provide a current discharge path for the control circuit when the circuit is disconnected from the power supply.

In another embodiment, a circuit for controlling inrush current to a load is provided. The circuit includes a power supply interface having first and second terminals adapted to be coupled to first and second terminals of a power supply. The circuit further includes a load interface having first and second terminals, adapted to be coupled to the load. The circuit further includes a variable impedance device having a control input. The variable impedance device is coupled between the power supply interface and the load interface. The variable impedance device includes a controllable current path between the power supply interface and the load interface. The circuit also includes a control circuit coupled to the control input of the variable impedance device and also coupled to the second terminal of the load interface. The control circuit is adapted to provide a signal at the control input of the variable impedance device which results in a linear increase in applied voltage to the load when the circuit is coupled to an input power source. A first resistor is coupled between the first terminal of the power supply interface and the control input of the variable impedance device. A second resistor is coupled between the first and second terminals of the power supply interface to provide a current discharge path for the first control circuit when the circuit is disconnected from the first and second terminals of the power supply.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with protecting functional circuits from potentially destructive inrush currents when electronic modules are "hot plugged" or "hot swapped" in a system under power. Embodiments of the invention solve the inrush problem in a simple and cost effective manner with a variable impedance device in a current path between the power supply and the functional circuit or load being protected. Advantageously, the voltage applied to a control input of the variable impedance device is adapted to provide an essentially linear increase in output voltage applied to the functional circuit so as to limit potentially destructive inrush currents when the electronic module is coupled to a live system.

Figure 1A:
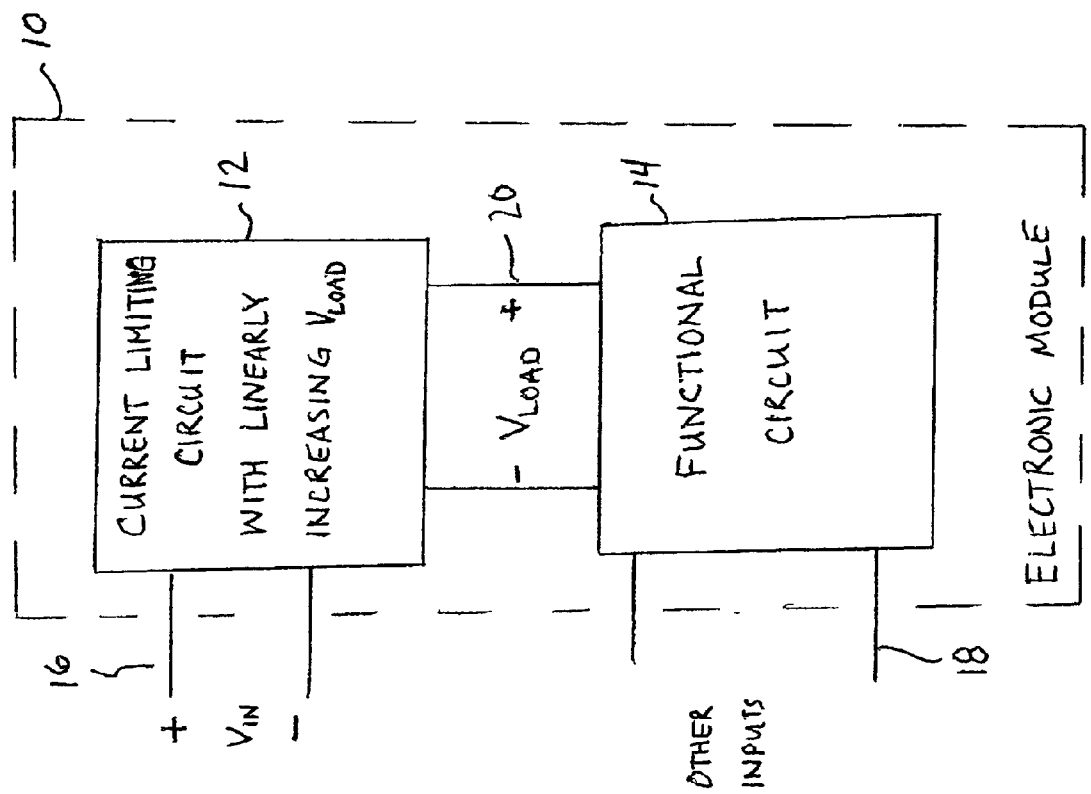
FIG. 1A is a block diagram of one embodiment of an electronic module with a current limiting circuit according to the teachings of the present invention.

FIG. 1A is a block diagram of one embodiment of the present invention. Electronic module 10 includes two main components, namely, current limiting circuit 12 and functional circuit 14. Typically, current limiting circuit 12 and functional circuit 14 are configured on a common circuit board such that electronic module 10 can be inserted into a system. Advantageously, current limiting circuit 12 is included in electronic module 10 to prevent inrush currents from damaging functional circuit 14 when electronic module 10 is hot plugged into a system under power.

Current limiting circuit 12 limits inrush currents to functional circuit 14. Current limiting circuit 12 includes power supply interface 16 that is adapted to be plugged in to receive power from a power source of the system. Current limiting circuit 12 further includes interface 20 to functional circuit 14. At interface 20, current limiting circuit 12 provides the output voltage, $V_{LOAD}$, to power functional circuit 14. It is understood that interface 20 is typically a logical interface between current limiting circuit 12 and functional circuit 14 on a circuit board. In some embodiments, this interface is a point where a separate current limiting circuit is plugged into functional circuit 14. Advantageously, current limiting circuit 12 linearly increases the voltage at interface 20 to thereby limit potentially destructive inrush currents when electronic module 10 is plugged into a live system. Further, current limiting circuit 12 uses a resistive component to assure complete discharge of functional circuit 14 when disconnected from the live system. This further prevents damage to functional circuit 14 by assuring proper operation of current limiting circuit 12 when re-plugged into the live system.

In one embodiment, current limiting circuit 12 is constructed as shown and described below with respect to FIG. 1B.

Functional circuit 14 provides the functional operation of electronic module 10. For example, in one embodiment, functional circuit 14 includes the necessary circuitry for a digital subscriber line card for a telecommunications system. In other embodiments, functional circuit 14 comprises any appropriate functional circuit for an electronic module that is hot pluggable into a live system. Functional circuit 14 includes other inputs 18 that communicate with the system during normal operation.

In operation, electronic module is inserted into and removed from a live system without damaging the circuit components of functional circuit 14. When inserted into the live system, current limiting circuit 12 linearly increases the voltage applied to functional circuit 14 at interface 20. This prevents inrush currents from reaching destructive levels. Further, when removed from the live system, current limiting circuit 12 also provides a discharge path that discharges functional circuit 14 and components of current limiting circuit 12 to assure proper operation of current limiting circuit 12 upon reinsertion into the live system.

Figure 1B:
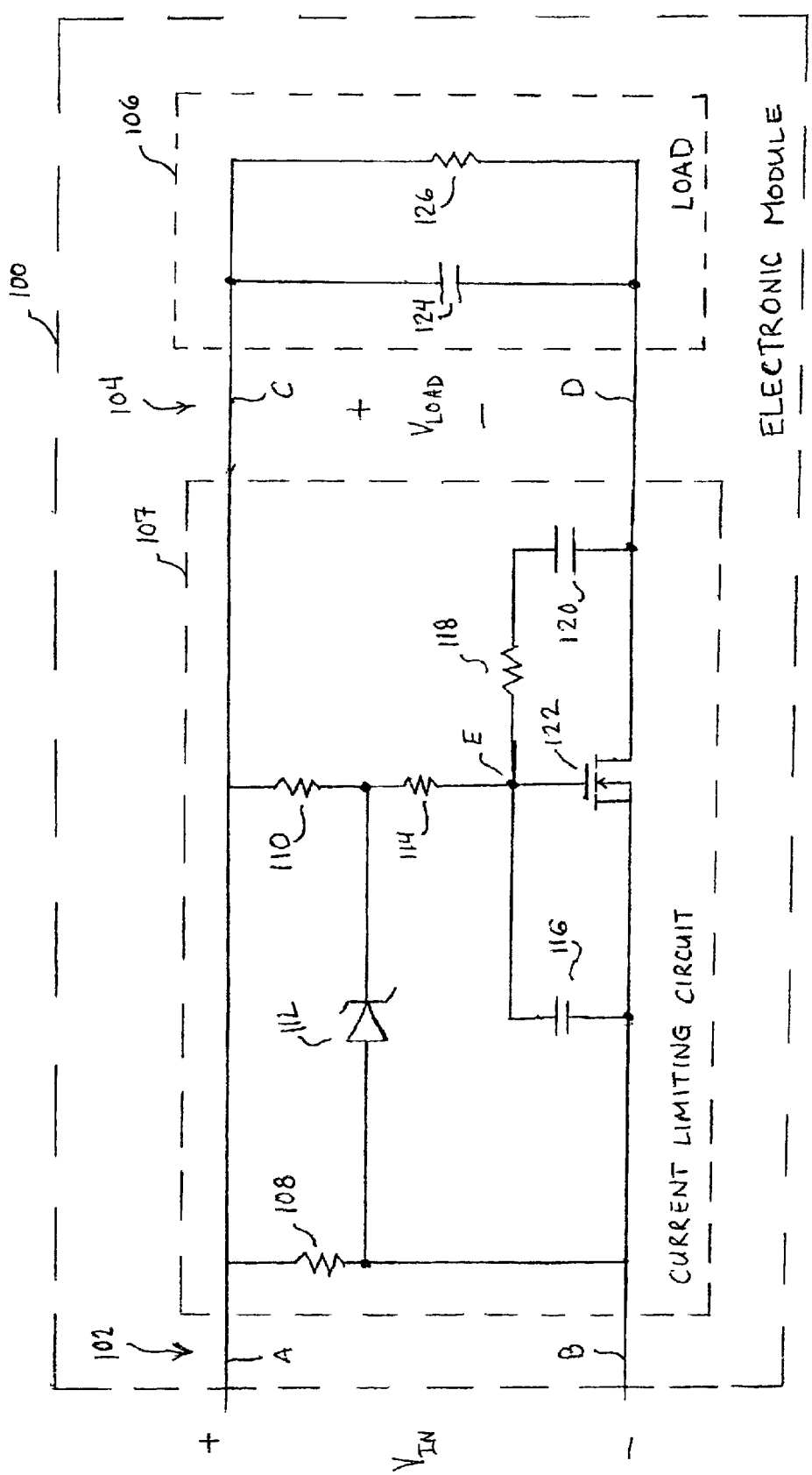
FIG. 1B is a schematic diagram of one embodiment of a current control circuit according to the teachings of the present invention.

FIG. 1B shows an electronic module or circuit board indicated generally at 100 according to one embodiment of the invention. Electronic module 100 is suitable for operation with a −48 VDC power supply voltage. For clarity in description, the components of electronic module 100 are described in terms of logical interfaces between the components. It is understood that these interfaces do not require nor exclude physical interfaces that require one circuit to be selectively plugged into the other circuit. The term is used merely for convenience in description.

Electronic module 100 includes power supply interface 102 with first and second nodes A and B and load interface 104 with first and second nodes C and D. Electronic module 100 further includes current limiting circuit 107 coupled between power supply interface 102 and load interface 104.

Current limiting circuit 107 limits inrush current to load 106. Load 106 is represented by capacitor 24 and resistor 26 coupled to the first and second nodes C and D of load interface 104. It is understood that load 106 is shown in this manner to represent the capacitive and resistive aspects of the load being protected. Load 106 is not part of the actual current limiting circuit. In one embodiment, load 106 comprises an appropriate functional circuit, e.g., a line card for telecommunications equipment such as a digital subscriber line (DSL) card. Alternatively, in other embodiments, load 106 comprises any other appropriate electronic circuit that is hot pluggable into a live system.

Current limiting circuit 107 uses a variable impedance device 122 to control the inrush current. As shown, variable impedance device 122 is an N-channel metal oxide semiconductor field effect transistor (MOSFET). Other appropriate devices with a variable impedance are used in other embodiments. Variable impedance device 122 includes a source that is coupled to node B of power supply interface 102, a drain that is coupled to node D of load interface 104 and a control input or gate coupled to node E.

Figure 2:
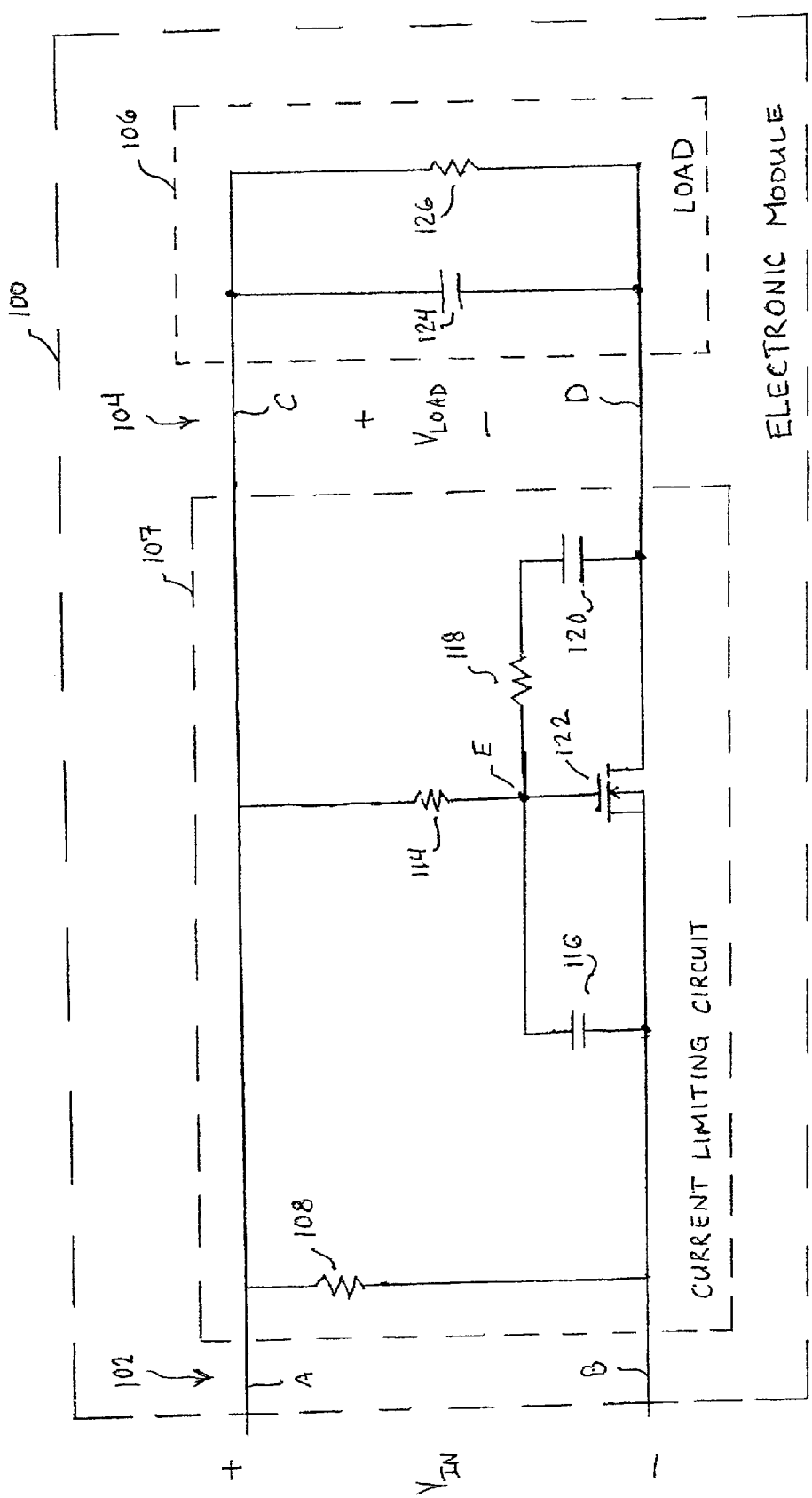
FIG. 2 is a block diagram of another embodiment of a current control circuit according to the teachings of the present invention.

The voltage at node E is controlled by a number of circuit elements to control the operation of variable impedance device 122 to limit the inrush current to load 106. First, zener diode 112 is coupled in series with resistor 110 between nodes A and B of power supply interface 102. This circuit regulates the voltage at node E and limits the steady state voltage at node E to a level that is suitable for application to the control input of variable impedance device 122. In other embodiments with lower power supply voltages that are on the order of the desired steady state voltage on node E, zener diode 112 and resistor 110 are omitted as shown in FIG. 2. Second, resistor 118 and capacitor 120 are coupled in series to form an RC circuit between node E and node D of load interface 104. Finally, capacitor 116 is coupled between node E and node B of power supply interface 102.

Resistor 114 is coupled between node E and zener diode 112. Resistor 114 provides the current necessary for charging capacitors 116, 120 and the control input of variable impedance device 122. This RC circuit sets the slope of the rate of the linear increase in voltage applied to the load at load interface 104. The use of resistors 110 and 114 in current limiting circuit 107 provides advantages over the circuit shown in the '455 Patent. For example, resistor 110 allows better voltage regulation by zener 112. By setting resistor 114 with a much higher resistance than resistor 110, zener 112 is provided with sufficient current to provide good voltage regulation independent of the voltage at the control input of variable impedance device 122. Further, by including resistor 114 with a high resitance level, current limiting circuit 107 provides similar levels of current limiting protection to the circuit of the '455 Patent while using much smaller capacitors.

Resistor 108 is coupled between nodes A and B of power supply interface 102 and provides a voltage discharge path for capacitors 116 and 120 and capacitor 124 of load 106.

In operation, current limiting circuit 107 limits the inrush current provided to load 106 when electronic module 100 is hot plugged into a live system at power supply interface 102. Before application of power, capacitors 116, 120 and 124 are in a discharged state. Upon sudden application of input power, input voltage is applied to capacitors 116, 124 and 120 in series with resistor 118 as well as resistor 110 in series with zener 112. Zener 112 and resistor 110 regulate the voltage at node E to a selected steady state voltage, e.g., 15 volts. Resistor 118, e.g., 10 kΩ, is chosen to limit charging current to low values, e.g., less than 10 mA, to reduce stress on the capacitors 116 and 120. Capacitor 120 charges quickly compared to capacitor 116 and load 106, e.g., less than 200 μS, due to its small value, e.g, 3.3 nF. Little voltage appears across capacitor 116, e.g., 100 nF, as it is much larger than capacitor 120, and very little across capacitor 124, e.g., typically on the order of 30 μF due to it being much larger than capacitor 116. Therefore, the voltage across load 106 is very close to zero and variable impedance device 122 is still in the off condition with the gate to source voltage below its threshold, e.g., Vgs is less than 2V.

Capacitor 116 begins charging through resistor 114 from a regulated voltage of zener 112. As current through resistor 114, e.g., 499 kΩ, is much lower than that of resistor 110, e.g., 20 kΩ, the charging current of capacitor 116 has a negligible effect on the regulation of zener 112. The gate voltage of variable impedance device 122 charges exponentially to the turn on point or threshold voltage for variable impedance device 122. When the voltage at the gate reaches the turn on point, drain current begins to increase causing a negative dv/dt at the drain of variable impedance device 122. Feedback from capacitor 120 and resistor 118 results in a linear change in voltage over time at the drain. This causes the drain to source voltage of variable impedance device 122 to decrease and load voltage to increase linearly. As the drain to gate voltage of variable impedance device 122 also decreases (becomes more negative), most of the charging current from resistor 114 is diverted by capacitor 120 as its value is multiplied by Miller Effect while variable impedance device 122 is operating in the linear region. Because the turn on of variable impedance device 122 occurs over a small range of gate to source voltage, current through resistor 114 remains nearly constant. Once the turn on voltage is reached, the voltage at the gate of variable impedance device 122 remains substantially constant.

The nearly constant current transferred through capacitor 120 results in a linear ramp of voltage across capacitor 116 and the load consisting of capacitor 124 and resistor 126 and will cause load capacitor 124 to be charged at a constant current proportional to it's value and the ramp rate, thereby preventing large inrush currents. As load capacitance is a controlled design parameter and ramp rate is determined by values of components 112, 114, 116, 120 and known characteristics of variable impedance device 122, load inrush current can be accurately controlled.

Once variable impedance device 122 reaches saturation, the change in voltage over time at the drain goes to zero and feedback ceases. During this period, the voltage at the gate of variable impedance device 122 returns to charging to the regulated voltage, e.g., 15 volts, along the original exponential curve. Under steady state powered conditions, this results in fully turned on conditions and low power loss.

This controlled turn on of variable impedance device 122 provides another advantage over the circuit shown in the '455 Patent. Specifically, upon plug in, the gate of transistor 22 of the '455 Patent begins charging exponentially toward the full power supply voltage, e.g., 48V, with a time constant established by resistors 16 and 18 and capacitor 22. In the current embodiment, the gate of transistor 122 charges toward the regulated voltage established by zener diode 112, e.g., 15V, with a time constant established by resistor 114 and capacitors 116 and 120. Thus, to achieve the same current inrush protection, the circuit of the '455 Patent would require components approximately three times the values needed with the embodiment of FIG. 1B.

Upon disconnection of power, capacitors 116, 120 and 124 will discharge through the load resistance 126 and resistors 108, 110, 114 and 118. Advantageously, this assures that the load is fully discharged upon disconnection from the circuit so that current limiting circuit 107 is effectively reset to limit inrush current on subsequent application of power to electronic module 100.

What is claimed is:

1. A circuit for controlling inrush current to a load, the circuit comprising:

a power supply interface having first and second nodes adapted to be coupled to first and second terminals of a power supply;

a load interface having first and second nodes, adapted to be coupled to the load;

a variable impedance device having a control input, the variable impedance device coupled between the power supply interface and the load interface, the variable impedance device including a controllable current path between the power supply interface and the load interface;

a control circuit coupled to the control input of the variable impedance device and also coupled to the second node of the load interface, wherein the control circuit is adapted to provide a signal at the control input of the variable impedance device that causes a linear increase in voltage applied to the load when the power supply interface is coupled to a power supply; and a resistor, coupled between the first and second nodes of the power supply interface to provide a current discharge path for the control circuit when the circuit is disconnected from the first and second terminals of the power supply.

2. The circuit of claim 1, wherein the control circuit comprises:

an RC circuit, including a first capacitor in series with a second resistor, a second capacitor, the second capacitor coupled between the control input and the second node of the power supply interface, the RC circuit coupled between the control input and the second node of the load interface; and at least one additional resistor coupled between the control input and the first node of the power supply interface.

3. The circuit of claim 2, wherein the second capacitor has a higher capacitance than the first capacitor.

4. The circuit of claim 1, wherein the variable impedance device comprises a MOSFET transistor.

5. The circuit of claim 1, and further including a regulator circuit coupled to limit the voltage on the control input of the variable impedance device.

6. The circuit of claim 5, wherein the regulator circuit includes a zener diode.

7. The circuit of claim 2, and further including a regulator circuit.

8. The circuit of claim 7, wherein the regulator circuit includes:

a zener diode coupled between the second node of the power supply interface and the at least one additional resistor; and a second additional resistor coupled between the first node of the power supply interface and the zener diode.

9. A circuit for controlling inrush current to a load, the circuit comprising:

a power supply interface having first and second nodes adapted to be coupled to first and second terminals of a power supply;

a load interface having first and second nodes, adapted to be coupled to the load;

a variable impedance device having a control input, the variable impedance device coupled between the power supply interface and the load interface, the variable impedance device including a controllable current path between the power supply interface and the load interface;

an RC circuit, including a first resistor coupled in series with a first capacitor, the first resistor also coupled to the control input of the variable impedance device and the first capacitor also coupled to the second node of the load interface;

a second capacitor, coupled between the control input and the second node of the power supply interface;

a voltage regulating circuit, coupled to the control input of the variable impedance device, that limits the voltage on the control input to a steady state level; and a second resistor, coupled between the first and second nodes of the power supply interface to provide a current discharge path for the first and second capacitors and the load when the circuit is disconnected from the first and second terminals of the power supply.

10. The circuit of claim 9, wherein the second capacitor has a higher capacitance than the first capacitor.

11. The circuit of claim 10, wherein the variable impedance device comprises a MOSFET transistor.

12. The circuit of claim 9, and further including a regulator circuit coupled to limit the voltage on the control input of the variable impedance device.

13. The circuit of claim 9, wherein the voltage regulating circuit includes a zener diode.

14. A circuit for controlling inrush current to a load, the circuit comprising:

a power supply interface having first and second nodes adapted to be coupled to first and second terminals of a power supply;

a load interface having first and second nodes, adapted to be coupled to the load;

a field effect transistor having a gate, the transistor coupled between the power supply interface and the load interface, the transistor including a channel coupled between the power supply interface and the load interface;

an RC circuit, including a first resistor coupled in series with a first capacitor, the first resistor also coupled to the control input of the variable impedance device and the first capacitor also coupled to the second node of the load interface;

a second capacitor, coupled between the control input and the second node of the power supply interface;

a zener diode, coupled to the second node of the power supply interface and an intermediate node;

a second resistor, coupled between the intermediate node and the control input of the transistor;

a third resistor, coupled between the first node of the power supply interface and the intermediate node;

wherein the zener diode limits the voltage on the control input to a selected steady state level; and a fourth resistor, coupled between the first and second nodes of the power supply interface to provide a current discharge path for the first and second capacitors and the load when the circuit is disconnected from the first and second terminals of the power supply.

15. An electronic module, the module comprising:

a power supply interface having first and second nodes adapted to be coupled to first and second terminals of a power supply;

a functional circuit having first and second nodes; and a circuit for controlling inrush current coupled to the first and second nodes of the functional circuit, the inrush control circuit comprising:

a variable impedance device having a control input, the variable impedance device coupled between the power supply interface and the functional circuit, the variable impedance device including a controllable current path between the power supply interface and the functional circuit, an RC circuit, including a first resistor coupled in series with a first capacitor, the first resistor also coupled to the control input of the variable impedance device and the first capacitor also coupled to the second node of the functional circuit, a second capacitor, coupled between the control input and the second node of the power supply interface, a voltage regulating circuit, coupled to the control input of the variable impedance device, that limits the voltage on the control input to a steady state level, and a second resistor, coupled between the first and second nodes of the power supply interface to provide a current discharge path for the first and second capacitors and the functional circuit when the electronic module is disconnected from the first and second terminals of the power supply.

16. The electronic module of claim 15, wherein the functional circuit comprises a functional circuit for a telecommunications line card.

17. The electronic module of claim 15, wherein the functional circuit comprises a digital subscriber line circuit.

18. A method for hot plugging an electronic module, the method comprising:

plugging a power supply interface of the electronic module into a power supply;

controllably turning on a variable impedance device when the electronic module is plugged into the power supply to limit inrush current provided to a functional circuit on the electronic module and to provide a linearly increasing voltage applied to the functional circuit;

limiting the voltage on a control input of the variable impedance device to a selected steady state level; and discharging the voltage on the control input through a resistor when the electronic module is disconnected from the power supply.

19. The method of claim 18, wherein controllably turning on a variable impedance device comprises controllably turning on a variable impedance device with a combination of an RC circuit and a capacitor coupled to a control input of the variable impedance device.

20. The method of claim 18, wherein controllably turning on a variable impedance device comprises:

exponentially increasing a voltage applied to a control input toward a low regulated level until a threshold is reached for the variable impedance device;

maintaining the voltage at the threshold level as a drain voltage decreases; and exponentially increasing the voltage applied to the control input until reaching the low regulated level.

21. A circuit for controlling inrush current to a load, the circuit comprising:

a variable impedance device having a control input; the variable impedance device is coupled between a power supply interface and a load interface;

a control circuit coupled to a control input of the variable impedance device and also coupled to the load interface;

the control circuit adapted to linearly increase a signal at the control input of the variable impedance device when the power supply interface is coupled to a power supply; and a resistor coupled between the first and second terminals of the power supply interface to provide a current discharge path for the control circuit when the circuit is disconnected from the power supply.

22. A circuit for controlling inrush current to a load, the circuit comprising:

a first node adapted to be coupled to a first power supply terminal;

a second node adapted to be coupled to a second power supply terminal;

a variable impedance device having a control input, the variable impedance device coupled to the second node and to the load, the variable impedance device including a controllable current path between the second node and the load;

a control circuit coupled to the control input of the variable impedance device and also coupled to the load, that provides a linear change in the voltage across the load upon application of power across the first and second nodes; and a resistor, coupled between the first and second nodes to provide a current discharge path for the control circuit and the load when the circuit is disconnected from the first and second power supply terminals.

23. The circuit of claim 22, wherein the control circuit comprises:

an RC circuit, including a first capacitor in series with a second resistor, a second capacitor, the second capacitor coupled between the control input of the variable impedance device and the second power supply terminal, the RC circuit coupled between the control input of the variable impedance device and the load; and at least one additional resistor coupled between the control input of the variable impedance device and the first power supply terminal.

24. The circuit of claim 23, wherein the second capacitor has a higher capacitance than the first capacitor.

25. The circuit of claim 22, wherein the variable impedance device comprises a MOSFET transistor.

26. The circuit of claim 22, and further including a regulator circuit coupled to limit the voltage on the control input of the variable impedance device.

27. The circuit of claim 26, wherein the regulator circuit includes a zener diode.

28. The circuit of claim 23, and further including a regulator circuit.

29. The circuit of claim 28, wherein the regulator circuit includes:

a zener diode coupled between the second power supply terminal and the at least one additional resistor; and a second additional resistor coupled between the at first power supply node and the zener diode.

30. The circuit of claim 5 wherein the regulator circuit limits the voltage applied to at least one element of the control circuit.

31. The circuit of claim 30 wherein the at least one element comprises an RC circuit including a first capacitor in series with a second resistor, the RC circuit coupled between the control input and the second node of the load interface.

32. The circuit of claim 30 wherein the at least one element comprises a second capacitor coupled between the control input and the second node of the power supply interface.

33. The circuit of claim 9 wherein the voltage regulating circuit limits the voltage applied to the RC circuit.

34. The circuit of claim 9 wherein the voltage regulating circuit limits the voltage applied to the second capacitor.

* * * * *